United States Patent
Juuti et al.

(10) Patent No.: US 9,332,462 B2
(45) Date of Patent: *May 3, 2016

(54) CAMPING IN AN EXCLUSIVE CELL

(71) Applicant: Nokia Technologies Oy, Espoo (FI)

(72) Inventors: Veli-Matti Juuti, Tuusula (FI); Juha Back, Espoo (FI); Tommi Kokkola, Espoo (FI); Johanna Pekonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,181

(22) Filed: May 28, 2015

(65) Prior Publication Data

US 2015/0264606 A1 Sep. 17, 2015

Related U.S. Application Data

(63) Continuation of application No. 13/934,005, filed on Jul. 2, 2013, now Pat. No. 9,072,030.

(51) Int. Cl.
*H04W 36/00* (2009.01)
*H04W 48/02* (2009.01)
*H04W 48/10* (2009.01)
*H04W 36/36* (2009.01)
*H04W 48/04* (2009.01)

(52) U.S. Cl.
CPC ...... *H04W 36/0033* (2013.01); *H04W 36/0016* (2013.01); *H04W 36/36* (2013.01); *H04W 48/02* (2013.01); *H04W 48/10* (2013.01); *H04W 48/04* (2013.01)

(58) Field of Classification Search
CPC ..... H04W 48/02; H04W 48/04; H04W 48/10; H04W 36/0016; H04W 36/36; H04W 36/0033
See application file for complete search history.

(56) References Cited

U.S. PATENT DOCUMENTS

| 5,903,832 | A  | * | 5/1999  | Seppanen et al. | 455/435.3 |
| 6,185,421 | B1 | * | 2/2001  | Alperovich et al. | 455/433 |
| 6,212,390 | B1 | * | 4/2001  | Rune | 455/456.6 |
| 6,230,017 | B1 | * | 5/2001  | Andersson et al. | 455/456.6 |
| 6,311,055 | B1 | * | 10/2001 | Boltz | 455/414.1 |
| 6,334,052 | B1 | * | 12/2001 | Nordstrand | 455/411 |
| 6,434,389 | B1 | * | 8/2002  | Meskanen et al. | 455/437 |

FOREIGN PATENT DOCUMENTS

| JP | H10257548 A | 9/1998 |
| WO | 9830056 A2 | 7/1998 |

* cited by examiner

*Primary Examiner* — Ajit Patel
(74) *Attorney, Agent, or Firm* — Ditthavong & Steiner, P.C.

(57) ABSTRACT

In a mobile communications system exclusive location areas comprising exclusive cells are defined in order to separate cells from the mobile stations not belonging to the user group allowed to camp in the cell and still to allow emergency calls for all mobile stations in these cells. During location update it is checked whether the cell belongs to an exclusive location area (202) and if it does, it is determined whether or not the subscriber is allowed to camp in the cell.

7 Claims, 3 Drawing Sheets

CAMPING IN AN EXCLUSIVE CELL

CROSS-REFERENCE TO RELATED APPLICATIONS

This application is a continuation of U.S. application Ser. No. 13/934,005, filed Jul. 2, 2013, which is herein incorporated by reference in its entirety.

BACKGROUND OF THE INVENTION

The present invention relates to cell selection in a mobile telecommunications network and especially to preventing some subscribers from camping in an exclusive access cell.

Mobile communications system generally refers to any telecommunications system which enables wireless communication when users are moving within the service area of the system. A typical mobile communications system is a Public Land Mobile Network (PLMN).

In cellular mobile communications systems, like the pan-European mobile communications system GSM (Global System for Mobile Communications), a mobile station may roam freely within the area of the mobile communications network and switch from one cell to another. Normally a mobile station camps in the cell the base station signal of which is best at the moment. Usually, all base stations provide substantially similar services for the mobile stations in a network. Some base stations can, however, be defined to provide a certain special service for all mobile stations of the network, e.g. call charges below the normal tariff. The base station broadcasts a message on such a special service on its broadcast control channel, whereby mobile stations in the cell served by the base station note that they are within a special service area of the network and may take advantage of this service.

Within the context of this application, such special service areas are referred to as localized service areas LSA and support for LSA is called SoLSA. A subscriber having a SoLSA service is called a SoLSA subscriber. A mobile station currently having support for the SoLSA is said to be in LSA mode. This could mean e.g. that the mobile station indicates to its user that certain special features (like lower rates or extra services) are available, and it uses these features when applicable. However, the mobile stations not supporting the SoLSA are not impacted by the presence of LSA services. The SoLSA for a GSM environment is described in a proposal to the ETSI (European Telecommunication Standard Institute), document GSM 03.73, version 2.0.0 which is incorporated herein by reference, but for convenience, the parts of this document which are essential for understanding the invention are repeated in this application.

The concept of LSA extends the operator's capability to offer different service features to subscribers or subscriber groups, different tariffs and different access rights depending on the location of the subscriber. Examples of LSAs are indoor office cells (those provided by indoor base stations); a home or an office and its neighbourhood, an industry area (covering all company buildings and the space between), or part or several locations of a city.

The network operator can define an LSA consisting of a cell or a number of cells. The cells constituting a LSA may not necessarily provide continuous coverage. It is possible for the network operator to set certain characteristics/attributes to each LSA. Some LSA related attributes may be managed as part of cell management. One cell may belong to one or more LSAs. There may also be cells which do not belong to any LSA. The LSA is identified by an LSA ID. For a subscriber, the network operator may define one or more LSA(s) as allowed LSA(s).

One feature of the concept of LSA is exclusive access EA. The EA attributes may be managed as part of cell management. An exclusive access cell is a cell where only mobile stations having the same exclusive access information as the cell are allowed to camp. With the EA it ought to be possible to guarantee that the members of a user group are the only users of the radio channels (physical resources) within a cell. In order to support exclusive access, other users' mobile stations must be prevented from camping in that cell. However, emergency calls should be allowed for every mobile station in that cell.

A problem with the above described is that there is no solution available to separate cells from the mobile stations not belonging to the user group and to allow emergency calls for all mobile stations in these cells including also mobile stations not supporting the SoLSA.

BRIEF DESCRIPTION OF THE INVENTION

The object of the invention is to overcome the above problem and, when no suitable cell where to camp is found, to allow the mobile stations, the users of which do not belong to the user group of an exclusive cell, to enter the limited service state and thus allow emergency calls. The object is achieved by means of methods, a network, a network element and a mobile station which are characterized by what is disclosed in the characterising part of the appended independent claims. Preferred embodiments of the invention are specified in the dependent claims.

The invention is based on using specific exclusive location areas comprising exclusive cells, i.e. cells with restricted access. Separate location areas are used for the normal cells, i.e. non-exclusive cells. With such location areas it is guaranteed that when entering a location area, a location update is triggered. During the location update procedure, the subcriber's right to access the cell is determined. If the subscriber is not a member of the user group allowed to camp in an exclusive cell, the location update will be rejected. However, the rejection of location update allows emergency calls.

By 'a user of a member group' it is meant that the subscriber fulfils the necessary conditions defined for the exclusive cell.

The advantage of the invention is that by restricting the operators freedom to define location areas only to some extent and by adding one check before actual location update it is possible to guarantee that only the users belonging to the user group defined for an exclusive cell can camp in that cell, but emergency calls can be made with all mobile stations, regardless whether they support the service needed in the exclusive cell or not.

In one embodiment of the invention the indication indicating an exclusive location area is preferably broadcast in the cell so that the mobile stations having no access to the cell do not even try to camp in that cell.

BRIEF DESCRIPTION OF THE DRAWINGS

The invention will be described in greater detail by means of preferred embodiments with reference to the accompanying drawings, in which.

DETAILED DESCRIPTION OF THE INVENTION

The invention can be applied to many kinds of cellular mobile communications system like the GSM system (phase 2+ or more) or corresponding mobile communications systems, such as DCS 1800 (Digital Cellular System for 1800 MHz) and PCS (Personal Communication System). The invention is also suitable for third generation mobile systems, such as Universal Mobile Communication System (UMTS) and Future Public Land Mobile Telecommunication System (FPLMTS) later renamed as IMT-2000 (International Mobile Telecommunication 2000), which at present are being developed. In the following, the invention will be described in greater detail by way of example mainly with reference to the basic GSM system, yet without limiting the invention to that kind of particular mobile system. For the sake of clarity, the GPRS (General Packet Radio Service) and CAMEL (Customised Applications for Mobile network Enhanced Logic) are not included in the basic GSM system. They are services of GSM 2+-phase.

Figure 1:
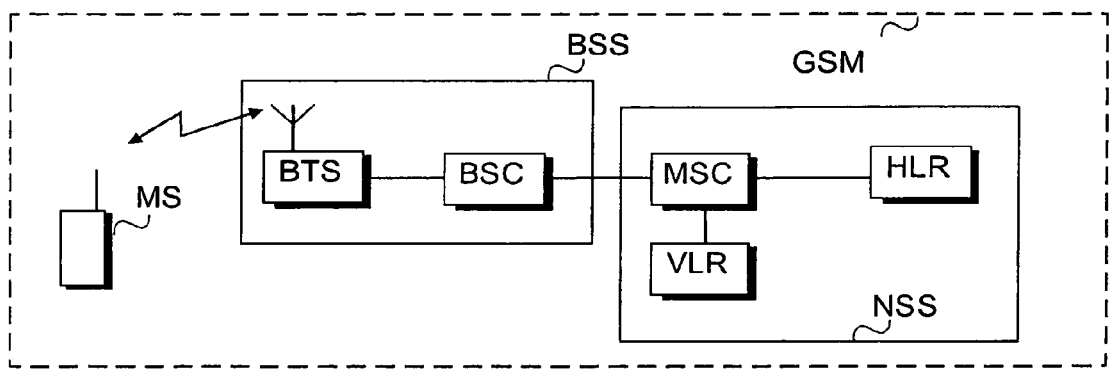
FIG. 1 is a block diagram of a mobile communications system.

FIG. 1 illustrates the basic structure of a GSM network. For a more detailed exposition of the GSM system, reference is made to *The GSM System for Mobile Communications*, M. Mouly and M. Pautet, Palaiseau, France, 1992, ISBN: 2-9507190-07-7.

Referring to FIG. 1, the GSM network configuration comprises two parts: a Base Station Subsystem BSS and a Network Subsystem NSS. The BSS and mobile stations MS communicate via radio connections. In a base station subsystem BSS each cell is served by a Base Transceiver Station BTS. A Base Transceiver Station is usually called a base station. A group of base stations BTS is connected to a Base Station Controller BSC, whose function is to manage the radio frequencies and channels used by the base station BTS. The base station controllers BSC are connected to a Mobile Switching Centre MSC. The function of a mobile switching centre MSC is to switch calls involving at least one mobile station MS. Some mobile switching centres MSC are connected to other telecommunication networks, such as the Public Switched Telephone Network PSTN, and they comprise transmission functions for switching calls to and from these networks. Such mobile switching centres are called gateway MSCs (not shown in the figure).

Two types of databases are associated with call routing. Subscriber information on all subscribers of the network is stored permanently or semi-permanently in a Home Location Register HLR, the information comprising information on the services that the subscriber has access to, e.g. subscriber specific LSA information. It may comprise one or more LSA (s) as allowed LSA(s) to the subscriber. There may also be subscribers without any LSA. Each LSA is identified with an LSA ID. The other type of register is a Visitor Location Register VLR. A visitor location register VLR is usually associated with a single mobile switching centre MSC, but it may also serve several exchanges. A visitor location register VLR can be integrated into a mobile switching centre MSC. Such an integrated network element is called a visited mobile switching centre MSC/VLR. When a mobile station MS is active (it has registered in the network, and can make or receive calls), most of the subscriber information, including the LSA ID(s) of the mobile station MS contained in the home location register HLR is loaded (copied) into the visitor location register VLR of the mobile switching centre MSC in the area of which the mobile station MS is.

In the GSM system serving as an example, a mobile station user is identified by a subscriber-specific identity module, or SIM card, which contains e.g. a subscriber identity IMSI. In the present application the word mobile station refers to a combination of actual mobile equipment and a user identified from a SIM card detachably coupled to the mobile equipment, unless otherwise stated. The use of an LSA service requires a SIM with SoLSA fields inserted into a dedicated mobile station with the LSA capability. These SoLSA fields include LSA Subscription information like the LSA ID(s) of the subscriber. Non-LSA mobile stations, even when operating with a SIM that contains SoLSA fields, are in the idle mode which is not impacted by the presence of LSA services.

In the GSM system Location Area is an area within which the mobile station may move freely without updating their location. The location area is identified with a location area code LAC. The location area consists of cells defined as belonging to that location area. The cells need not be neighbouring cells, but they need to be in the area of the same PLMN. According to the preferred embodiments of the invention, exclusive location areas are defined so that if there is one exclusive cell defined as belonging to the location area, all the other cells belonging to the same location area are also exclusive cells. The cells of an exclusive location area are preferably in the area of the same visitor location register.

When applying the invention to the concept of LSA, the exclusive access cells and the non-exclusive access cells of one location service area should have different location areas. All the exclusive access cells of one local service area may belong to one exclusive location area regardless of their geographical location. It is also possible that the exclusive access cells of one local service area belong to different exclusive location areas. So cells with different location area codes LAC may have the same location service area identities LSA ID(s). The exclusive location areas may comprise cells from a plurality of localized service areas. The subscriber's right to access a cell belonging to a particular localized service area can then be determined by using an exlusive access identifier identifying the subscribers who are allowed to access that particular localized service area. The identifier is preferably broadcasted in the cell so that the SoLSA mobile stations having no access to the cell do not even try to camp in that cell.

In the GSM system each base station broadcasts its location area code and when an MS notices that the location area has changed, it performs location update. Also, cell selection or reselection or handover takes place. These procedures are described in detail in ETSI recommendations GSM 03.22 version 6.0.0 and GSM 05.08 version 6.3.0. These recommendations are incorporated herein by reference, but for convenience, the parts of these documents which are essential for understanding the invention are repeated in this application.

Figure 2:
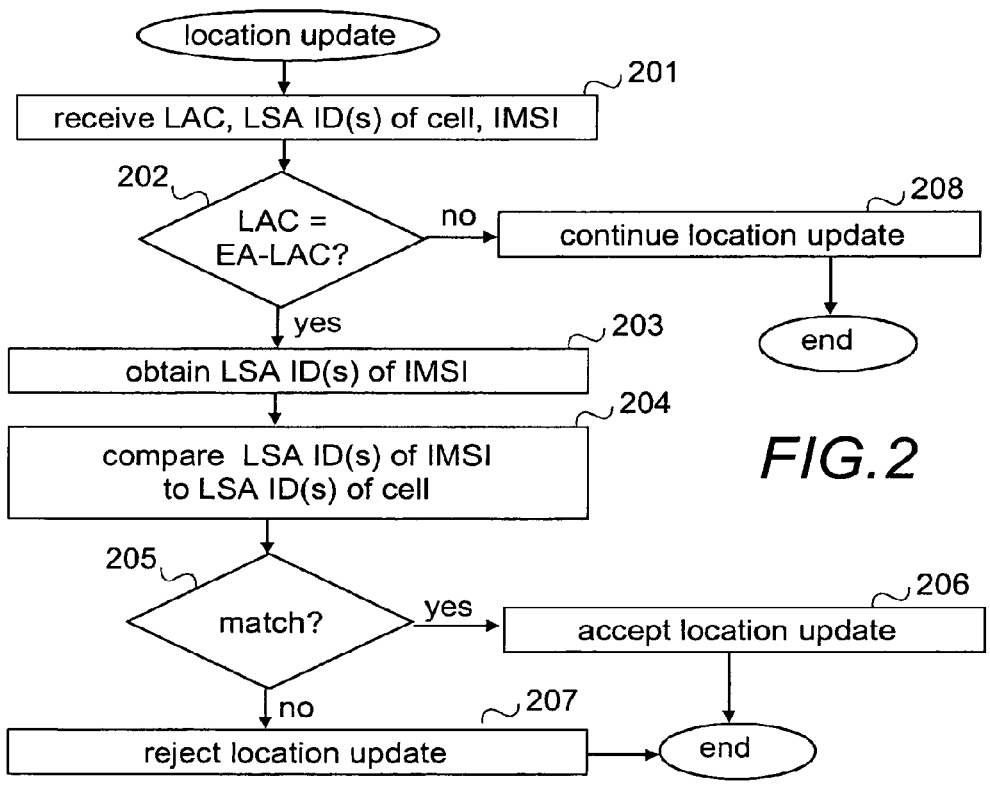
FIGS. 2, 3 and 4 are flow charts illustrating the functionality of the MSC in the first, second and third preferred embodiments of the invention.

FIG. 2 is a flow chart illustrating the functionality of the MSC in the first preferred embodiment of the invention. In the first preferred embodiment the LACs of the exclusive location areas in the area of the MSC are stored in the MSC. These LACs are called below EA-LACs.

Referring to FIG. 2, an MS has found that the location area broadcast by the BSS has changed and triggers a location update procedure. In step 201 the MSC receives the LAC and LSA ID(s) of the cell in which the MS wants to camp and the IMSI in the SIM inserted into the mobile station. In step 202 the MSC checks whether the received LAC is an EA-LAC. In other words, the MSC goes through the stored exclusive LACs and compares the received LAC to them. If the received LAC is not an EA-LAC, the location update is continued in step 208 according to the prior art.

If the received LAC is an EA-LAC, the MSC obtains the LSA ID(s) of the received IMSI from the VLR in step 203 and in step 204 compares them to the LSA ID(s) of the cell received in step 201. If there is a match in step 205, the MSC accepts the location update in step 206. If there is no match in step 206, the MSC rejects the location update in step 207 with a cause value "roaming not allowed in this location area".

Figure 3:
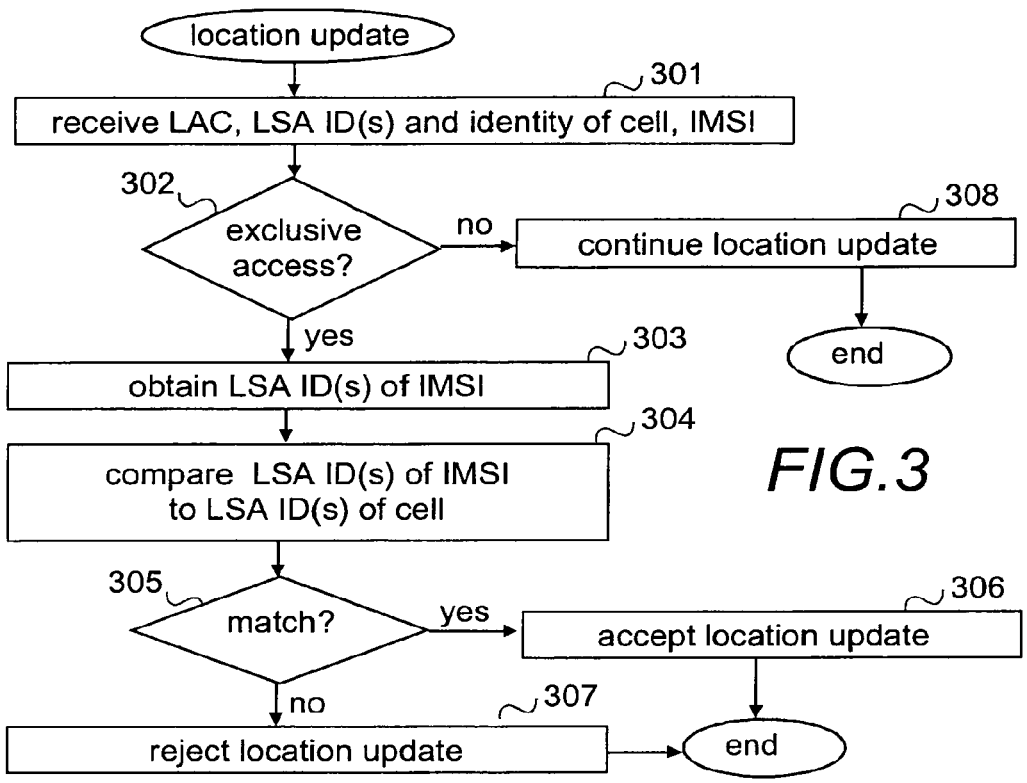

FIG. 3 is a flow chart illustrating the functionality of the MSC in the second preferred embodiment of the invention. In the second preferred embodiment the identities of the exclusive access cells in the area of the MSC are stored in the MSC.

Referring to FIG. 3, an MS has found that the location area broadcast by the BSS has changed and triggers a location update procedure. In step 301 the MSC receives the LAC, LSA ID(s) and identity of the cell in which the MS wants to camp and the IMSI in the SIM inserted into the mobile station. In step 302 the MSC checks whether the received cell identity is included in the exclusive access cell identities stored in the MSC. If the received cell identity is not found there, the location area is not an EA-LAC and the location update is continued in step 308 according to the prior art.

If the received cell identity is found in the exclusive access cell, the location area is an EA-LAC. Then the MSC obtains the LSA ID(s) of the received IMSI from the VLR in step 303 and in step 304 compares them to the LSA ID(s) of the cell received in step 301. If there is a match in step 305, the MSC accepts the location update in step 306. If there is no match in step 306, the MSC rejects the location update in step 307 with a cause value "roaming not allowed in this location area".

Figure 4:
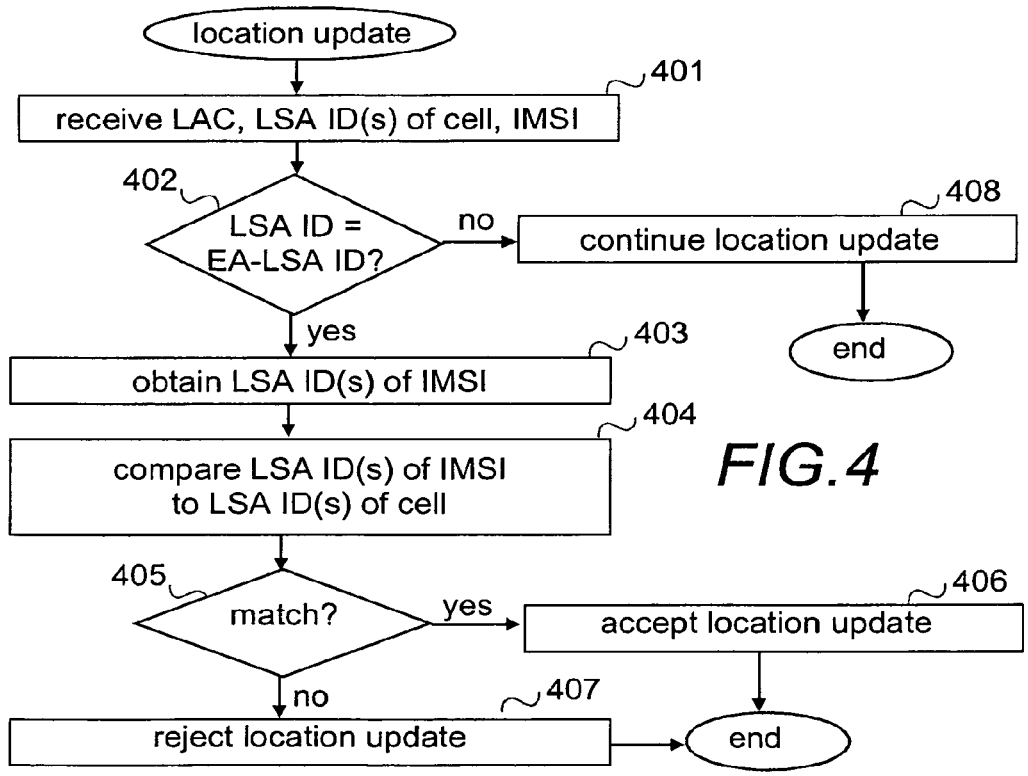

FIG. 4 is a flow chart illustrating the functionality of the MSC in the third preferred embodiment of the invention. In the third preferred embodiment of the invention the location service areas are also defined so that all the cells belonging to the LSA are either exclusive access cells or not. Thus, in the third preferred embodiment there are no LSA having both exclusive access cells and non-exclusive access cells as can be the case in the first and second preferred embodiments of the invention. In the third preferred embodiment the LSA IDs of the exclusive location service areas having exclusive access cells and being in the area of the MSC are stored in the MSC. These LSA IDs are called below EA-LSA IDs. In the third preferred embodiment, if a cell has more than one LSA ID(s), none or all of them have to be EA-LSA IDs. If they are EA-LSA ID(s), all the cells belonging to the same location area have to have the same LSA ID(s).

Referring to FIG. 4, an MS has found that the location area broadcast by the BSS has changed and triggers a location update procedure. In step 401 the MSC receives the LAC and LSA ID(s) of the cell in which the MS wants to camp and the IMSI in the SIM inserted into the mobile station. In step 402 the MSC checks whether one of the received LSA ID(s) is an EA-LSA ID. In other words, the MSC goes through the stored exclusive LSA IDs and compares the received LSA ID(s) to them. If none of the received LSA ID is an EA-LSA ID, the location area is not an EA-LAC and the location update is continued in step 408 according to the prior art.

If one of the received LSA ID(s) is an EA-LSA ID, the MSC obtains s the LSA ID(s) of the received IMSI from the VLR in step 403 and in step 404 compares them to the LSA ID(s) of the cell received in step 401. If there is a match in step 405, the MSC accepts the location update in step 406. If there is no match in step 406, the MSC rejects the location update in step 407 with a cause value "roaming not allowed in this location area".

In another embodiment based on the third embodiment, only the first received LSA ID is checked in step 402. If it is not an EA-LSA ID, neither is (are) the other LSA ID(s). And if it is, so are the others.

The message received in steps 201, 301 and 401 is preferably COMPLETE_LAYER3_INFORMATION to which the LSA ID(s) of the cell are added. Also other messages may be used.

In other embodiments of the invention the BSS adds an indication indicating whether the cell is an exclusive access cell e.g. into the above-mentioned message. The MSC decides on the basis of the indication whether the location area is an exclusive access location area. Thus there is no need to store any information in the MSC in these embodiments. The information may be stored as part of cell information in the BSC or BTS.

In some other embodiments of the invention some other cause values may be used. The used cause value has to allow emergency calls and prevent the mobile station from camping in the cell. In other words, the mobile station has to enter a limited service state where emergency calls can be made and the MS tries to find a suitable cell, i.e. a cell with another LAC.

Yet in some other embodiments the information used for deciding whether the cell belongs to an exclusive access location area is stored in some other network element and the MSC inquiries this information from that element.

Still in some other embodiments it is checked after step 203, 303 or 403 whether the subscriber's local service area information is empty and if it is, we skip over steps 204 and 205, 304 and 305 or 404 and 405 to a step where the location update is rejected.

Figure 5:
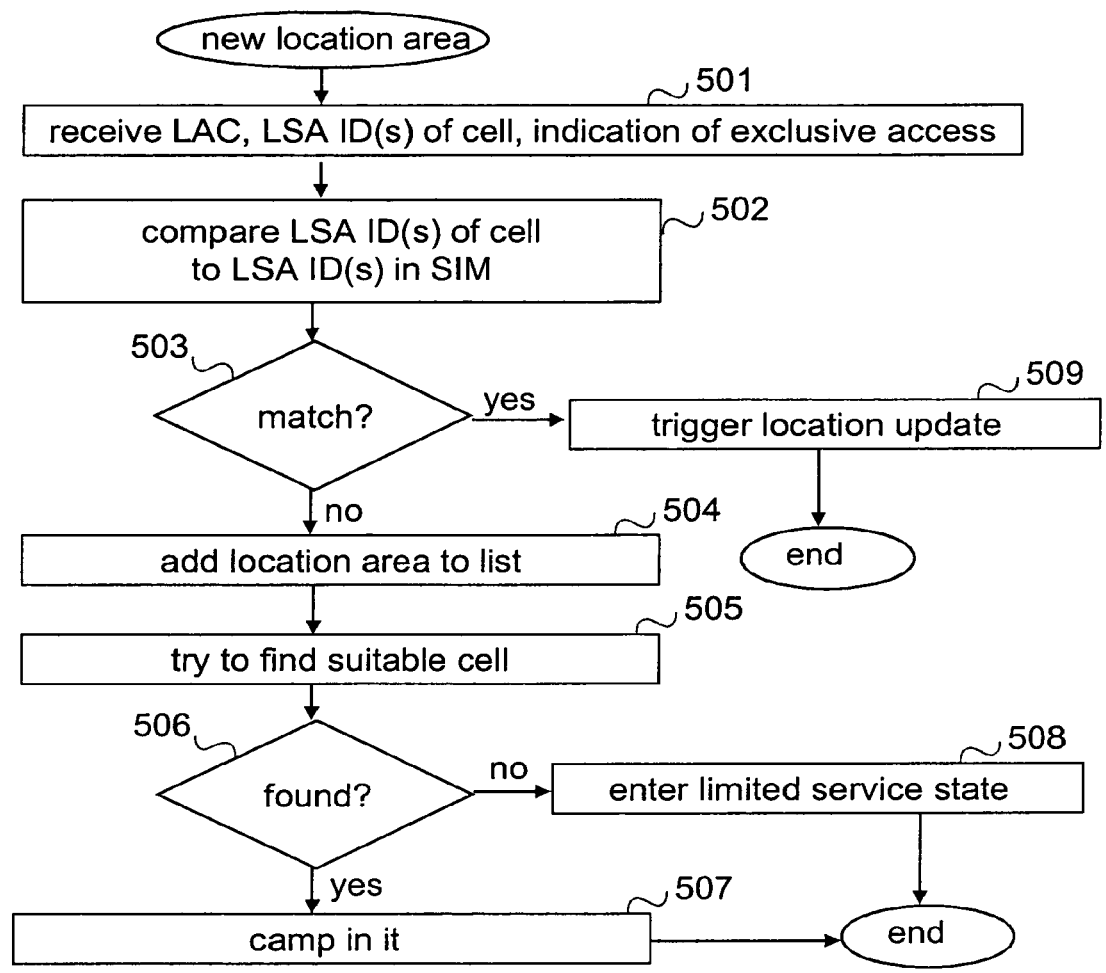
FIG. 5 is a flow chart illustrating the functionality of the MS in the fourth preferred embodiment.

FIG. 5 is a flow chart illustrating the functionality of a SoLSA compatible MS according to the fourth preferred embodiment of the invention. The cell service definitions supported by a SoLSA compatible MS are local service area definitions. Other cell service definitions, like the capability to use high speed data, may be also used. This MS functionality illustrated in FIG. 5 can be utilized with network functionalities according to any of the above described embodiments, for example. In the fourth preferred embodiment of the invention base stations broadcast information indicating whether the cell is an exclusive access cell. Preferably, when a cell is an exclusive access cell, a bit or a bitmap indicating it is added into the broadcast message. In the example illustrated in FIG. 5 it is assumed that the mobile station has just moved from one location area to another.

Referring to FIG. 5, in step 501 the mobile station receives broadcast information indicating the exclusive access cell, LAC and LSA ID(s) of the cell. The location area is new, so there is a need to trigger location update. However, because the indication indicating an exclusive access cell was also received, the mobile station performs some "location update preanalyses" in order to find out whether it can update the location. Therefore the mobile station compares the received LSA ID(s) of the cell with the LSA ID(s) in the SIM in step 502. If there is a match in step 503, the mobile station triggers the actual location updating procedure with the network in step 509 and continues in the fifth preferred embodiment according to the first preferred embodiment. In some other embodiments location update is continued according to some other above described preferred embodiment or according to the prior art.

If there is no match in step 503, the mobile station adds the location area in the list of "forbidden location areas for roaming" in step 504 and then tries to find a suitable cell in step 505. If a suitable cell is found in step 506, the mobile station camps in it in step 507 according to the prior art. If a suitable cell is not found in step 506 the mobile station enters a limited service state in step 508, which was described earlier.

The advantage of the fourth embodiment is that the SoLSA mobile stations do not unnecessarily load the network by trying to update their location to a cell they are not allowed to. However, the fifth embodiment guarantees that the mobile stations not supporting the SoLSA do not camp in an exclusive access cell but enter a limited service state where emergency calls can be made.

The steps have not been set out in absolute chronological order in FIGS. 2-5. Some of the above described steps may take place simultaneously or in different order. Some steps may actually comprise several steps, like receiving the information in steps 201, 301 and 401. It is also possible to receive more information in one step as stated above. Also other steps not shown in the figures may take place between the steps stated above. The used identification information may differ from that described in examples. For example, instead of the IMSI, a temporary mobile subscriber identity TMSI may be used.

Although the invention is described above with the concept of LSA and exclusive access cell, the invention is not limited to them. The exclusive location areas may be used with other services which aim to restrict camping in special cells. For example, it is possible to allow only mobile stations supporting high speed data to camp in special high speed data cells by defining exclusive location areas comprising special high speed data cells. Thus instead of comparing the LSA ID(s) of the cell with subscriber's LSA ID(s), other criteria can used when determining whether the mobile station is allowed to camp in the cell.

It is also possible to have networks comprising different kinds of exclusive location areas. In such networks the criteria used for determining whether a mobile station is allowed to camp in the cell are indicated. This indication may be implemented in many ways. For example, the indication may be stored with each EA-LAC. With this indication right criteria for that exclusive location area are used, i.e. LSA ID(s) when exclusive location area comprises exclusive access cells or the support for high speed data when the exclusive location area comprises special high speed data cells.

The present invention can be implemented in the existing network elements. They all have processors and memory with which the inventive functionality described above may be implemented and/or application specific circuits can be added to them. The functionality described above with FIGS. 2, 3 and 4 may also take place in some other network element than the MSC, such as Service Control Point SCP or Serving SGSN Support Node SGSN.

It will be obvious to one skilled in the art that the basic idea of the invention can be implemented in many different ways. The invention and its embodiments are thus not limited to the examples described above but may be modified within the scope of the appended claims. The accompanying drawings and the description pertaining to them are only intended to illustrate the present invention. Different variations and modifications to the invention will be apparent to those skilled in the art, without departing from the scope and spirit of the invention defined in the appended claims.

The invention claimed is:

1. A method, comprising:
   receiving, by a Mobile Switching Center (MSC), a Location Area Code (LAC) and Location Service Area Identifier (LSA-ID) of one of a plurality of cells in a location area in which a mobile station wants to camp, and an identity of the mobile station;
   checking, by the MSC, whether the received LAC is an Exclusive Access Location Area Code (EA-LAC); and
   causing, at least in part, a continuation of a location update if the LAC is not an EA-LAC or, if the LAC is an EA-LAC, retrieving the LSA-ID from a Visitor Location Register (VLR), comparing the retrieved LSA-ID with the LSA-ID of the cell received by the MSC and, if there is a match, accepting the location update; otherwise rejecting the location update and displaying a message on the mobile terminal that roaming is not permitted by the mobile station in the location area.

2. The method according to claim 1, wherein the identity of the mobile station is retrieved from an International Subscriber Mobile Identity (IMSI) within a Subscriber Identity Module (SIM) card in the mobile station.

3. The method according to claim 1, wherein the checking by the MSC comprises comparing the received LAC to stored exclusive LACs.

4. The method according to claim 1, wherein the VLR is within a Network SubSystem (NSS).

5. The method according to claim 1, wherein the EA-LAC is indicative of an exclusive cell in which only mobile stations belonging to a specified user group are permitted to camp.

6. The method according to claim 5, wherein a mobile station not belonging to the specified user group may still make emergency calls within the exclusive cell.

7. The method according to claim 1, wherein all the cells in the location area are exclusive access cells or all of the cells in the location area are non-exclusive access cells.

* * * * *